(12) United States Patent
Rutyna et al.

(10) Patent No.: US 6,685,099 B2
(45) Date of Patent: Feb. 3, 2004

(54) CABIN AIR PURGE STRATEGY

(75) Inventors: Arthur Rutyna, Plymouth, MI (US); Cindy Marie Rutyna, Plymouth, MI (US); Paul Raymond Murray, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 136 days.

(21) Appl. No.: 10/038,840

(22) Filed: Dec. 31, 2001

(65) Prior Publication Data

US 2003/0121988 A1 Jul. 3, 2003

(51) Int. Cl.$^7$ ................................................. B60H 1/26
(52) U.S. Cl. ...................... 236/49.3; 236/91 C; 454/75; 454/258
(58) Field of Search ................................ 236/49.3, 91 R, 236/99 C, 91 C, 91 E, 44 R, 44 C; 454/75, 258, 256, 239; 62/133, 180, 244; 165/202, 203, 204

(56) References Cited

U.S. PATENT DOCUMENTS

| | | |
|---|---|---|
| 3,357,338 A | 12/1967 | Pollock |
| 4,497,240 A | 2/1985 | Nagatomo et al. ......... 62/236 X |
| 4,909,044 A | 3/1990 | Gudmundsen ................ 62/236 |
| 5,129,192 A | 7/1992 | Hannush ................. 236/49.3 X |
| 5,222,661 A | 6/1993 | Wenhart ..................... 236/49.3 |
| 5,361,593 A | 11/1994 | Dauvergne ..................... 62/89 |
| 5,509,852 A | 4/1996 | Clark ........................... 454/75 |
| 5,579,994 A | * 12/1996 | Davis et al. ............... 236/49.3 |
| 6,145,330 A | * 11/2000 | Goto et al. ................... 62/180 |

\* cited by examiner

*Primary Examiner*—Harry B. Tanner
(74) *Attorney, Agent, or Firm*—Brinks Hofer Gilson & Lione (57) ABSTRACT

A ventilation system for purging air contained with a vehicle interior is disclosed. The ventilation system includes a blower, a first vent, a second vent, at least one interior temperature sensor, at least one external temperature sensor, a motion sensor for windy days and dusty areas, a humidity sensor, a sunload sensor and a control module. The blower is a conventional vehicle air conditioning blower and is located within the vehicle interior for creating a pressure differential between the interior and exterior of the vehicle. The first vent expels air from the vehicle interior and the second vent draws external air into the vehicle interior. The at least one interior sensor is located within the vehicle interior for determining an interior condition of the vehicle. The at least one external sensor determines an external condition of environment external to the vehicle interior. Finally, the control module is in communication with the blower, first and second vents, interior and exterior sensors for monitoring the internal and exterior sensors and comparing the sensor outputs to predefined thresholds for actuating the blower, first and second vents to exhaust the air contained within the interior of the vehicle and draw in ambient air.

13 Claims, 7 Drawing Sheets

CABIN AIR PURGE STRATEGY

TECHNICAL FIELD

The present invention generally relates to systems and methods for purging super heated air contained within a passenger compartment of an automobile.

BACKGROUND

The air contained within the interior of a vehicle absorbs the sun's radiated emissions and depending on the external environment can become extremely hot after a vehicle has been exposed to the sunlight for an extended period of time. Typically, the vehicle passenger must ventilate the passenger compartment by lowering the vehicle windows. While this manual method of purging the super heated air works to remove the air from the interior of the vehicle, unfortunately, the vehicle occupant is also subjected to the super heated air. Consequently, depending on how long the vehicle has been exposed to sunlight the cool down time or "time to comfort" might be significant causing the vehicle occupant to be subjected to a very uncomfortable environment.

While this and other prior art systems and methods for controlling the build up of super heated air within vehicle interiors achieve their intended purpose other problems still exist. For example, ventilating super heated air through vehicle sunroofs and windows leaves the vehicle vulnerable to theft, as well as water damage in rainy conditions, and dirt in dusty conditions. Generally, prior art solutions are inflexible and only eliminate the super heated air at fixed times and for fixed time periods.

Therefore, what is needed is a new and improved system and method for controlling the build up of super heated air within an interior compartment of a vehicle. Such a new and improved system and method should ventilate the super heated air only as required to provide a comfortable environment for vehicle occupants.

SUMMARY

In accordance with an aspect of the invention a ventilation system for purging air contained within a vehicle interior is provided. The ventilation system includes a blower, a first vent, a second vent, at least one interior temperature sensor, at least one external temperature sensor, a humidity sensor, a motion sensor for windy days and dusty areas, a sunload sensor and a control module. The blower is a conventional vehicle air conditioning blower and is located within the vehicle interior for creating a pressure differential between the interior and exterior of the vehicle. The first vent expels air from the vehicle interior and the second vent draws external air into the vehicle interior. The at least one interior sensor is located within the vehicle interior for determining an interior condition of the vehicle. The at least one external sensor determines an external condition of environment external to the vehicle interior. Finally, the control module is in communication with the blower, first and second vents, interior and exterior sensors for monitoring the internal and exterior sensors and comparing the sensor outputs to predefined thresholds for actuating the blower, first and second vents to exhaust the air contained within the interior of the vehicle and draw in ambient air.

In accordance with another aspect of the invention a method for ventilating hot air contained with a vehicle interior is provided. The method includes creating a pressure differential between the interior and exterior of the vehicle using a bi-directional blower, expelling air from the vehicle interior using a first vent, drawing external air into the vehicle using a second vent, determining an interior condition of the vehicle using at least one interior sensor located within the vehicle interior, determining an external condition of the environment external to the vehicle using at least one external sensor, and finally, communicating with the blower, first and second vents, interior and exterior sensors to monitor the internal and exterior sensors and to compare the sensor outputs to predefined thresholds to actuate the blower, first and second vents to exhaust the air contained within the interior of the vehicle and draw in ambient air, using a control module.

Further objects, features and advantages of the invention will become apparent from consideration of the following description and the appended claims when taken in connection with the accompanying drawings.

DETAILED DESCRIPTION

The following description of the preferred embodiment is merely exemplary in nature, and is in no way intended to limit the invention or its application or uses.

Figure 1:
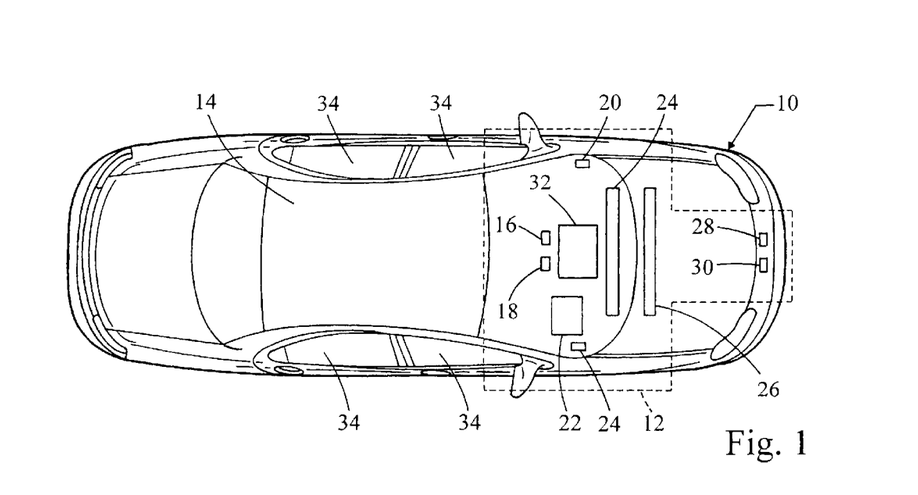
FIG. 1 is a schematic diagram of a system for controlling the build up of super heated air within a vehicle's interior, in accordance with the present invention.

Shown in FIG. 1 is a vehicle 10 that includes a cabin air purge system (CAPS) 12 for evacuating super heated air trapped within the passenger compartment 14 of vehicle 10. Cabin air purge system 12, includes a passenger compartment temperature sensor 16, a passenger compartment humidity sensor 18, a motion sensor 20, a bi-directional blower motor 22, defrost vents 24, fresh air intake vent 26, ambient temperature sensor 28, ambient humidity sensor 30, and a cabin air purge control module 32. Passenger compartment temperature sensor 16 and passenger compartment humidity sensor 18 are placed within the passenger compartment of vehicle 10 for measuring the temperature and humidity of the passenger compartment, respectively. Motion sensor 20 also located within the passenger compartment may be used in conjunction with the other sensors to detect wind direction. Blower motor 22 is capable of running in a forward direction to draw fresh air into the fresh air intake vent 26 and distributing the air into the passenger compartment through the panel/floor vents 24. Blower motor 22 also may be operated in reverse to draw cabin air into the defroster vents 24 and expel the air out of the passenger compartment through fresh air intake vent 26.

With continuing reference to FIG. 1, ambient temperature sensor 28 and ambient humidity sensor 30 are illustrated, in accordance with the present invention. Ambient temperature sensor 28 and ambient humidity sensor 30 are placed outside of the passenger compartment. Temperature sensor 28 measures the ambient air temperature while humidity sensor 30 measures the ambient air humidity.

Figure 2:
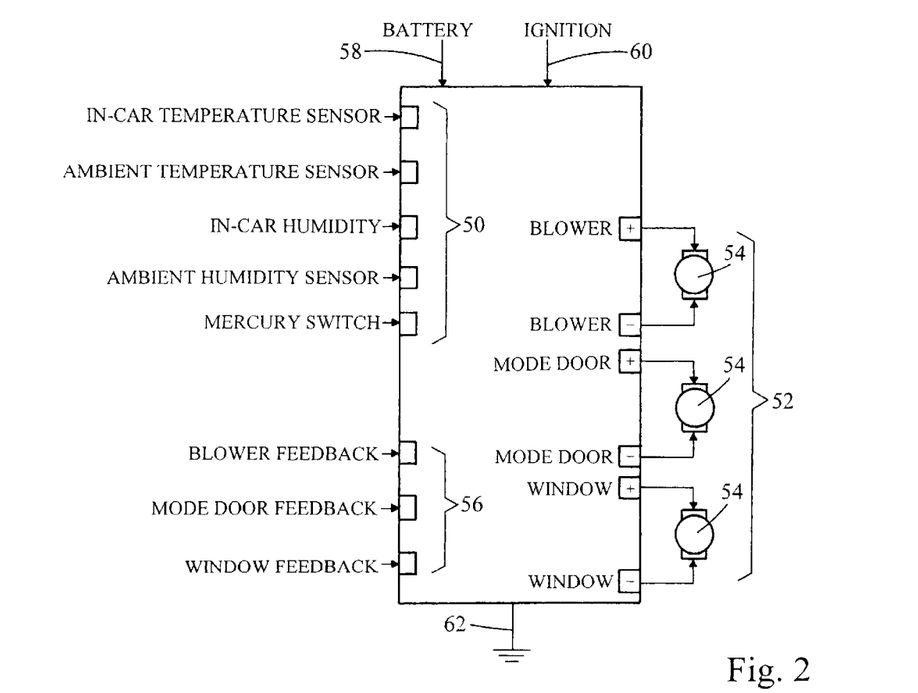
FIG. 2 is a block diagram illustrating a control module for use with the system of the present invention.
Figure 3A:
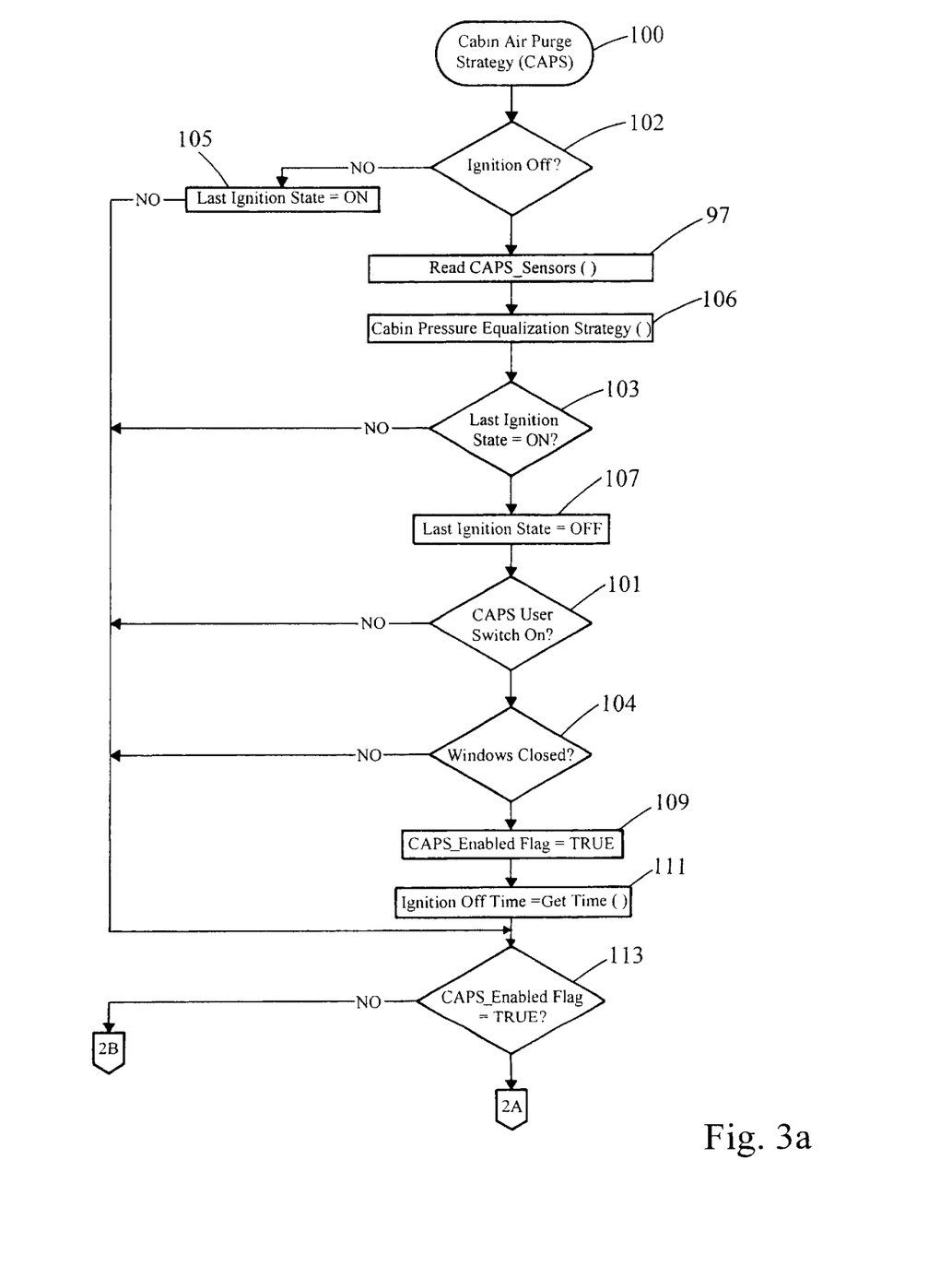
FIGS. 3a–d are flow diagrams illustrating a method for controlling build up of super heated air within a vehicle interior, in accordance with the present invention.
Figure 3B:
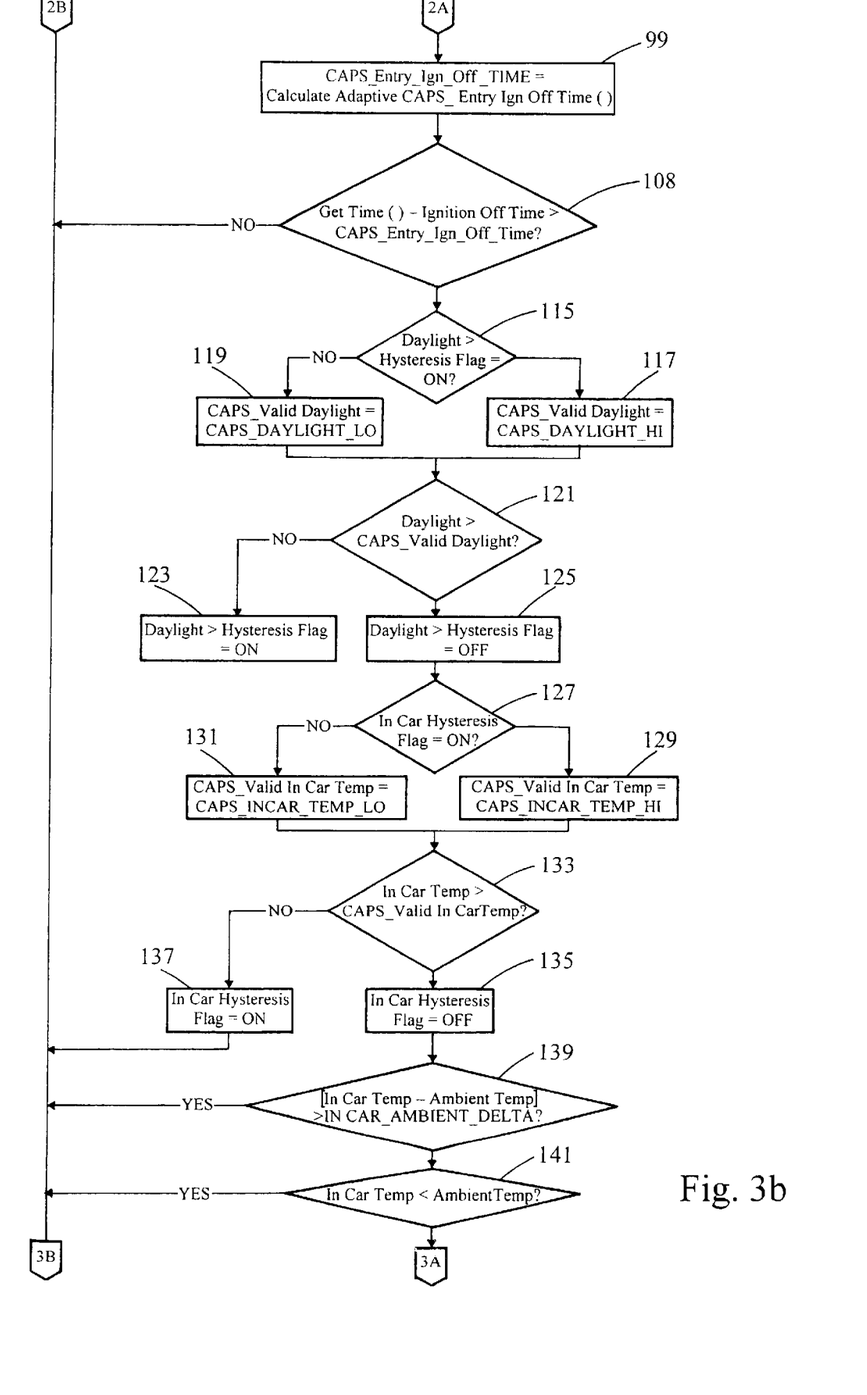
Figure 3C:
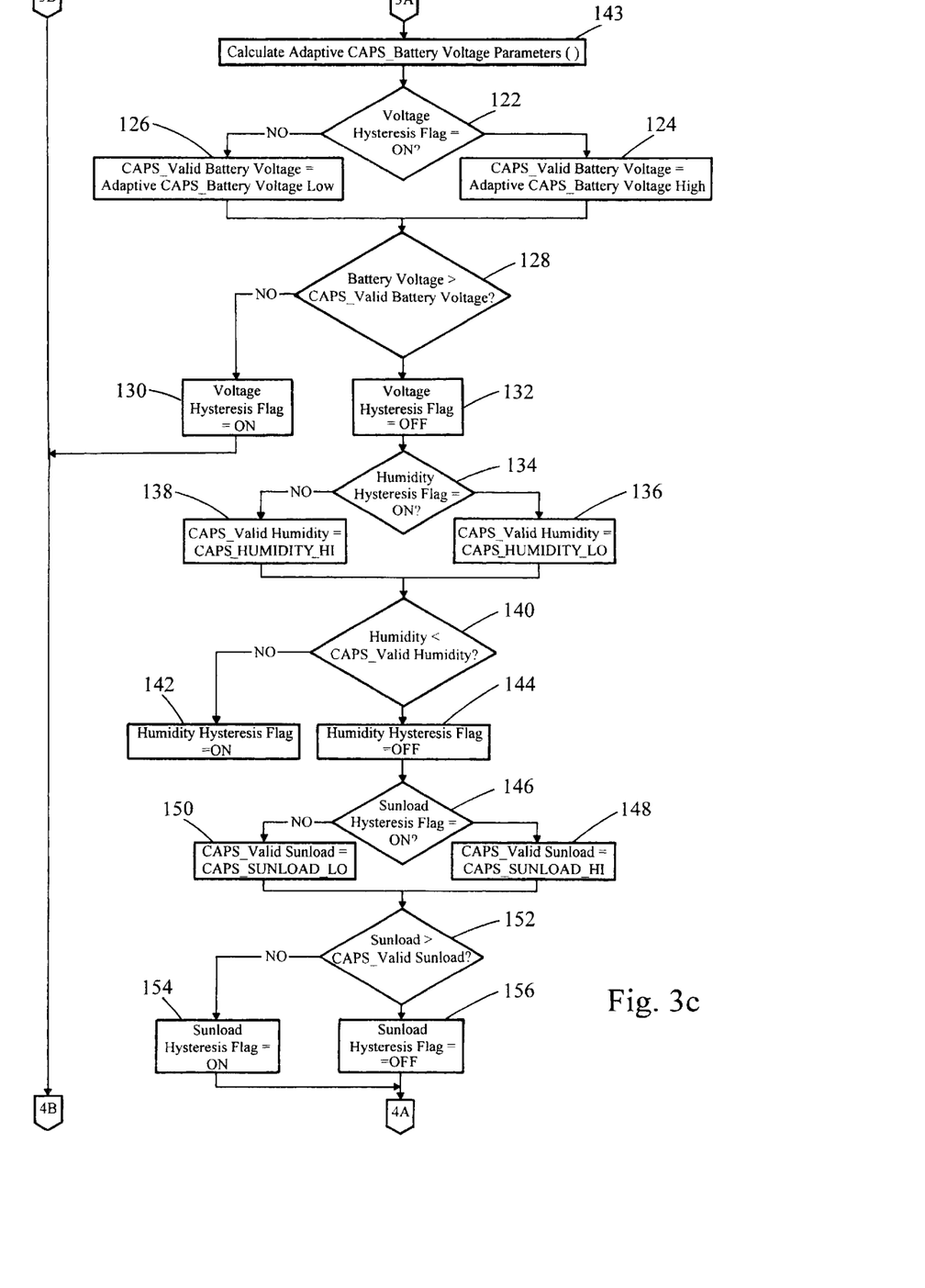
Figure 3D:
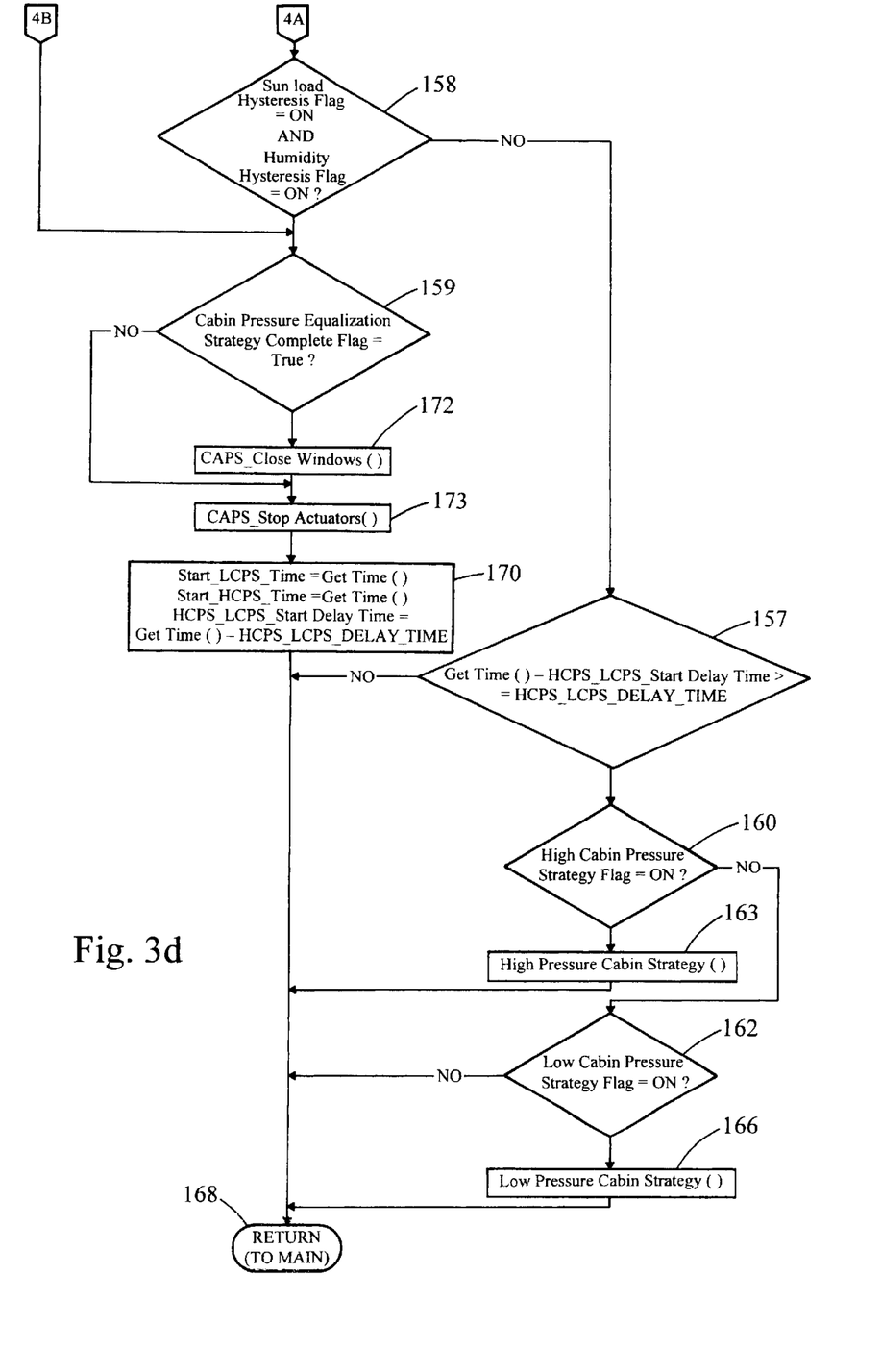

Control module 32, is shown in greater detail in FIG. 2. Control module 32 is operatively configured to receive sensor signals from the sensors described above. As will be described in greater detail below, control module 32 broadcasts control signals to actuate various vehicle components such as windows 34, the mode doors (not shown) of the vehicles climate control system, and blower motor 22 to carry out the cabin air purge strategy of the present invention. Other vehicle components may also be actuated by control module 32 to aid in carrying out the control strategy. For example, a vehicle sunroof may also be used to purge cabin air or draw in ambient air.

Control module 32 is preferably located within the passenger compartment and has a plurality of sensor input ports 50 for receiving various sensor signals. It will be apparent to one of ordinary skill in the art that additional input ports and/or output ports may be utilized for communicating with additional sensors and vehicle components. Accordingly, a plurality of actuator ports 52 are provided on control module 32 for actuating various vehicle components 54.

Vehicle components 54 may include blower motor 22, mode door (not shown) and windows 34. Of course, other motor vehicle components and systems may also be actuated by control module 32 for enhancing the operation of cabin air purge system 12. Additionally, for each of the vehicle components 54 actuated by control module 32, feedback input ports 56 are provided in control module 32 for receiving feedback signals from the vehicle components. For example, a blower motor feedback signal allows control module 32 to determine the direction of the blower motor, as well as, the rotational speed of the motor. Similarly, a mode door feedback signal is received by control module 32 for determining mode door status, such as open or closed. A window feedback signal is also provided, for enabling control module 32 to determine the window status (open or closed).

With continuing reference to FIG. 2, battery power 58, ignition 60, and ground 62 connections are illustrated, in accordance with the present invention. Battery power connection 58 provides a battery voltage signal to control module 32 to allow monitoring of the battery voltage to insure the system does not degrade the battery voltage to an unacceptable level. For example, the present invention may prevent the continued operation of the cabin air purge system to insure the vehicle's engine will start. The unacceptable battery voltage level is, of course, temperature dependent. Additionally, an adaptive learning strategy is incorporated to optimize battery performance. Ignition connection 60 provides the input that triggers control module 32 to operate. Ground connection 62 provides the required electrical ground for control module 32, typically, ground 62 is at or near the voltage level of the negative battery terminal.

Reference is now made to FIGS. 3a–3d, wherein a cabin air purge strategy (CAPS) or methodology is illustrated, in accordance with the present invention. The cabin air purge strategy is initiated, at block 100. At block 102, an ignition switch is checked. If the ignition switch is "OFF" then a read CAPS sensors routine is initiated, at block 97. The CAPS sensors that are read are, for example, the sensors described above. At block 106 a cabin pressure equalization strategy is initiated. The cabin pressure equalization strategy cracks open the windows (if they are shut) when the ignition is turned "OFF" and any car door is opened. Further, the windows are then shut after all the car doors are closed. Thus, door closing efforts are reduce and the vehicle has a higher quality feel. However, If the ignition switch is not "OFF", then a last ignition state flag is set to "ON", as represented by block 105. The last ignition state is determined, at block 103. If the last ignition state is "ON" then the last ignition state flag is set to "OFF", as represented by block 107. This path is only executed once upon the transition from ignition "ON" to ignition "OFF".

At block 101, a CAPS user switch is checked. If the CAPS user switch is "on" then the system checks whether the windows are closed, at block 104. However, if the CAPS user switch is "OFF" then the system determines the whether a CAPS enable flag has been set to "TRUE", at block 113.

A block 104, the system determines whether the windows are closed. If the windows are determined to be closed then the "CAPS enabled flag" is set to "TRUE", as represented by 109 and an "ignition off time" variable is set to "getTime( )", at block 111. This function gets the current time and stores it in the variable "ignition off time". Thus, as illustrated above, CAPS is only activated if the ignition transitions from "on" to "off" and the CAPS user switch is "on" and the windows are closed at the time of the ignition transition. A CAPS enabled flag is checked, at block 113. If the CAPS enabled flag is "TRUE" then a CAPS entry ignition off time is set equal to a calculated adaptive CAPS entry ignition off time, as represented by block 99. However, if CAPS enabled flag is not set to "True" then a cabin pressure equalization strategy complete flag is set equal to "True", as represented by block 159.

The cabin air purge strategy also determines how long the ignition has been "off", as represented by block 108. This "ignition off-time" determination is calibratable and is selected based on the environmental conditions the vehicle will be primarily exposed to. Further this "ignition off time" is determined via an adaptive learning algorithm. For example, if the vehicle is primarily operated in an extremely hot environment, the ignition "off time" may be adjusted to a low value in order to activate the cabin air purge strategy more often. Thus, if the getTime( ) minus the ignition "off time" is not greater than the preset ignition "off time" (or CAPS_entry_IGW_off_time) the cabin air purge strategy is restarts. However, if the ignition "off time" is greater than the preset ignition "off time", then the cabin air purge strategy continues at block 115 where a daylight hysteresis flag is checked. Thus, the present invention does not enable CAPS unless the vehicle has been off for a minimum amount of time. For example, preferably CAPS is not activated when a user goes to a gas station to re-fuel the vehicle.

If the daylight hysteresis flag is "on" as it would be during a first cycling of the cabin air purge strategy then a CAPS_Validdaylight variable is set to a high value, as represented by block 117. However, if the daylight hysteresis flag is "off", then the CAPS_Validdaylight variable is set to a low value, as represented by block 119. At block 121, the daylight, as measured at block 97 is compared to the CAPS_Validdaylight variable. If the current daylight is not greater than the CAPS_Validdaylight variable, then the daylight hysteresis flag is set to "off", as represented by block 125 and the cabin air purge strategy is terminated. However, if the current daylight is greater than the CAPS_Validdaylight variable, then the daylight hysteresis flag is set to "on", as represented by block 123. Thus, CAPS is aborted if it is dark outside (i.e. night time), since it is unlikely the temperature of the vehicle's interior will be elevated due to radiated heat from the sun. This strategy also lessens wear and tear on the battery and other mechanical actuators.

Continuing at block 127, the strategy checks the in car hysteresis flag. If the in car hysteresis flag is "on" as it would be during a first cycling of the cabin air purge strategy then a CAPS_ValidinCarTemp variable is set to a high value, as represented by block 129. However, if the in car hysteresis flag is "off", then a CAPS_ValidinCarTemp variable is set to a low value, as represented by block 131. At block 133, the in car temperature, as measured during the block 97 is compared to the CAPS_ValidinCarTemp variable. If the current in car temperature is not greater than the CAPS_ValidinCarTemp variable the in car hysteresis flag is set to "on", as represented by block 137 and the cabin air purge strategy is restarted. However, if the ambient temperature is greater than the ambient temperature variable, then the ambient hysteresis flag is set to "off", as represented by block 120. Thus, if an in-car temperature is low then CAPS is aborted.

At block 110 it is determined whether the algorithm will be using a "low" or "high" temperature constant when determining whether or not to execute the cabin air purge strategy. Upon entering this algorithm the first time the hysteresis flag is set to "on" which means that the ambient temperature must be higher than the "hi" temperature constant, block 112, to continue with the cabin air purge strategy, block 116. This means that the strategy will never be executed unless the ambient temperature has exceeded this "hi" temperature constant, block 118. Assuming that the ambient temperature has exceeded the "hi" temperature constant, block 116, the ambient hysteresis flag is set to "off", block 120. This means that the next time the algorithm executes, block 110, the temperature constant which is compared against the ambient temperature, is the "low" temperature constant, block 114. Therefore, even when the ambient temperature falls below the ambient temperature "hi" constant the cabin air purge strategy will continue to function based on the ambient temperature sensor input until it falls below the "low" constant. In which case, the ambient hysteresis flag is set to "on", block 118 and the strategy is disabled till the ambient temperature sensor rises above the "hi" temperature constant. This insures that the system is not cycled rapidly because of an ambient temperature sensor that is fluctuating by several degrees. This protects the system from wear and tear, and provides for more efficient operation. The method or control strategy of the present invention uses hysteresis and hysteresis flags throughout for this purpose.

Continuing at block 127, the strategy checks an InCar hysteresis flag. If the InCar hysteresis flag is "on" as it would be during a first cycling of the cabin air purge strategy then an CAPS_InCar variable is set to a high value, as represented by block 129. However, if the InCar hysteresis flag is "off", then the CAPS_InCar variable is set to a low value, as represented by block 131. At block 133, the InCar temperature, as measured during the cabin pressure equalization strategy of block 106, is compared to the CAPS_ValidInCar temperature. If the current InCar temperature is not greater than the CAPS_ValidInCar temperature the InCar hysteresis flag is set to "on", as represented by block 137 and the cabin pressure equalization strategy complete flag is set equal to "True", as represented by block 159. However, if the InCar temperature is greater than the CAPS_ValidInCar temperature variable, then the InCar hysteresis flag is set to "off", as represented by block 135.

At block 139, an ambient temperature is subtracted from the in car temperature and the result is compared to an Incar_ambient_delta variable. If the result is greater than the Incar_ambient_delta variable then the cabin pressure equalization strategy complete flag is set equal to "True", as represented by block 159. Thus, if the absolute value of the difference between the in car temperature and the ambient air temperature is greater than the calibratable value "in car_ambient delta" CAPS is aborted. This may result from a malfunctioning sensor, or the vehicle recently running with the heater on in cold weather, or the AC running in hot weather. However, if the result is less than the Incar_ambient_delta variable then the in car temperature is compared to the ambient temperature at block 141. If the in car temperature is less than the ambient temperature then the cabin pressure equalization strategy complete flag is set equal to "True", as represented by block 159. However, if the in car temperature is greater than the ambient temperature then a calculate adaptive CAPS battery voltage parameter routine is executed, at block 143. This routine calculates an "AdaptiveCAPS_BatteryVoltage low" and an "AdaptiveCAPS_BatteryVoltage High" parameters. Thus, if the vehicle's interior is cooler than the outside air temperature, CAPS is aborted. This may occur, for example, if it is a sunny day and the vehicle is parked in the shade and the AC has been running for a significant period of time.

At block 122 a voltage hysteresis flag is checked to determine whether the flag is "on". If the flag is "on", then a voltage variable is set to a high voltage, as represented by block 124. However, if the voltage hysteresis flag is "off", then the voltage variable is set to a low voltage level, as represented by block 126. The system voltage as measured during the cabin pressure equalization strategy of block 106, is compared to the voltage variable, as represented by block 128. If the system voltage is not greater than the voltage variable, the voltage hysteresis flag is set to "on", as represented by block 130 and the cabin air purge strategy is terminated. However, if the system voltage is greater than the voltage variable then the voltage hysteresis flag is set to "off", as represented by block 132. Thus, the system verifies that the battery has enough voltage to operate CAPS and allow the vehicle to be started.

A humidity hysteresis flag is checked, at block 134. If the humidity hysteresis flag is "on", then a humidity variable is set to a low humidity level, as represented by block 136. However, if the humidity hysteresis flag is set to "off", then the humidity variable is set to a high humidity level, as represented by block 138. At block 140, the humidity read during the cabin pressure equalization strategy of block 106 is compared to the humidity variable. If the current humidity is greater than the humidity variable, then the humidity hysteresis flag is set to "on", as represented by block 142. However, if the humidity is less than the humidity variable, the humidity hysteresis flag is set to "off", as represented by block 144. Thus, if it is very humid the humidity hysteresis flag will be set to "on".

At block 146, a sunload load hysteresis flag is checked to determine whether it is "on". If the sunload hysteresis flag is "on", then a sunload variable is set to a high sunload value, as represented by block 148. However, if the sunload hysteresis flag is set to "off", then the sunload variable is set to a low sunload value, as represented by block 150. At block 152, the actual measured sunload measured during the cabin pressure equalization strategy routine of block 106 is compared to the value of the sunload variable. If the sunload is not greater than the sunload variable, then the sunload hysteresis flag is set to "on", as represented by block 154. However, if the sunload is greater than the sunload variable, the sunload hysteresis flag is set to "off", as represented by block 156. Thus, if it is very cloudy the sunload hysteresis flag will be set to "on".

At block 158, the sunload hysteresis flag and the humidity hysteresis flag are checked. If the sunload hysteresis flag and the humidity hysteresis flag are set to "on" then the cabin pressure equalization strategy complete flag is set equal to "True", as represented by block 159. At block 172, a CAPS_Close Window( ) routine is executed to close the vehicle's windows. Thus, if it is cloudy and humid (high chance of rain) then CAPS is aborted. Moreover, this strategy uses feedback current from the window motors to determine if anything is blocking the window's path. If the window's path is being blocked the window opens and tries to closes several times. If the window's path is still blocked the window will remain open.

At block 173, a CAPS_StopActuators( ) routine is initiated. This routine stops the operation of the climate control motor and mode doors. Various system variable are then reset at block 170 before the strategy returns to the beginning, as represented by block 168.

However, if either the sunload hysteresis flag or the humidity hysteresis flag are set to "off", then a HCPS_LCPS_StartDelay time is subtracted from a gettime( ) variable and the result is compared to a HCPS_LCPS_Delay_Time constant, at block 157. If the result is greater than or equal to the HCPS_LCPS_Delay_Time constant a high pressure cabin strategy flag is checked, at block 160. This allows for a time delay between the High Cabin Pressure Strategy (HCPS) and Low Cabin Pressure Strategy (LCPS), so that the system is not running the blower continuously till the battery is drained.

If the high pressure cabin strategy flag is "off", then a low pressure cabin strategy flag is checked, at block 162. However, if the high pressure cabin strategy flag is set to "on", then the high pressure cabin strategy routine is initiated, as represented by block 163, and thereafter the strategy returns to the beginning of the process, as represented by block 168. Upon initial entry into this algorithm the high pressure cabin strategy flag is "on" which will initiate the execution of the high pressure cabin strategy. The high pressure cabin strategy incorporates a series of timers and logic that set the high pressure cabin strategy flag to "off" and turns "on" the low pressure cabin strategy flag.

Accordingly, at block 166 a low pressure cabin strategy routine is initiated if the low cabin pressure strategy flag is on, as determined at block 162. Thereafter, the strategy returns to the beginning of the process, as represented by block 168. However, if the low pressure cabin strategy flag is off then the strategy returns to the beginning of the process, as represented by block 168. Likewise, the low pressure cabin strategy also incorporates a series of timers and logic that turns "off" the low pressure cabin strategy flag and turns "on" the high pressure cabin strategy flag. This enables a mutually exclusive cycling of the low pressure cabin strategy and the high pressure cabin strategy.

Figure 4:
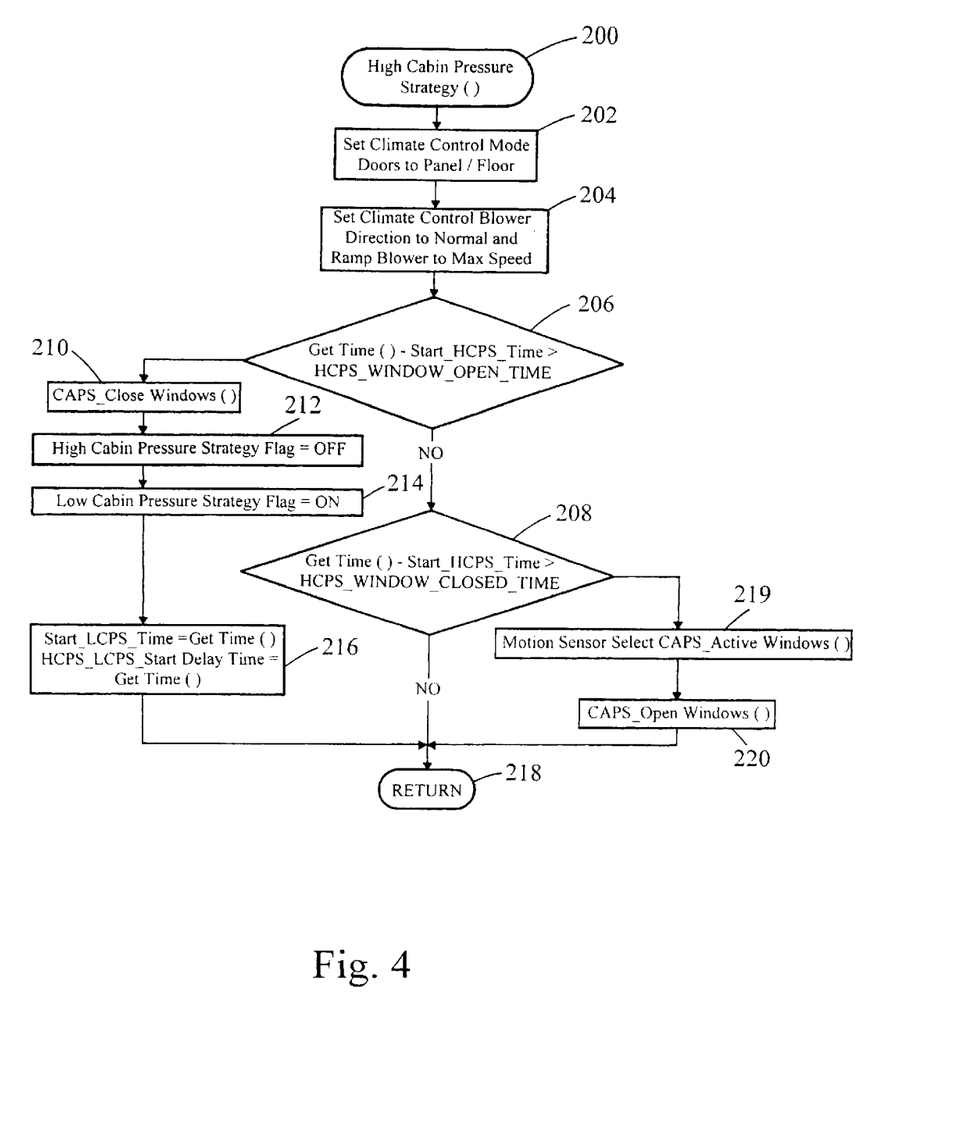
FIG. 4 is a flow diagram illustrating a method for carrying out a High Cabin Pressure Strategy, in accordance with the present invention.

The high cabin pressure strategy is illustrated in flow chart form in FIG. 4. In operation, the high cabin pressure strategy is initiated at block 200. At block 202, the climate control mode doors are set to panel/floor. The climate control blower direction is set to normal and the blower is set to maximum speed, as represented by 204. At block 206, a startHCPS_Time is subtracted from the gettime( ) and the result is compared to HCPS_Window_Open_Time variable. Here the system determines whether the windows have been open long enough. HCPS_Window_Open_Time must be greater than HCPS_Window_Closed_Time for the strategy to function properly. If the result is not greater than HCPS_Window_Open_Time the result is compared to HCPS_Window_Closed_Time variable to determine if the windows have been closed long enough, as represented by block 208. However, if the result is greater than HCPS_Window_Open_Time variable then a CAPS_CloseWindow routine is activated, at block 210. At block 212, the high cabin pressure strategy flag is set to "off". At block 214, the low cabin pressure strategy flag is set to "on". At block 216, a start_LCPS_Time variable is set equal to the getTime( ) variable and then terminates at return block 218. Thus, the HCPS is completed, the windows are closed and setup for LCPS.

However, if at block 208, the result of startHCPS_Time subtracted from gettime( ) is greater than HCPS_Window_Closed_Time variable then a MotionSensorSelectCAPS_ActiveWindows( ) routine and a CAPS_OpenWindow( ) routines are activated, at blocks 219 and 220. The MotionSensorSelectCAPS_ActiveWindows( ) routine determines wind direction and which windows should be opened. Thereafter, the strategy returns to the starting point, as represented by block 218. However, if at block 208, the result of startHCPS_Time subtracted from gettime( ) is less than HCPS_Window_Closed_Time variable then the strategy terminates at return block 218.

Thus, in operation the high cabin pressure strategy forces outside air into the vehicle via panel and floor vents, for example, by running the blower in the normal forward direction while the windows are closed. This will cause the hotter air to rise within the vehicle interior and create a positive pressure within the vehicle interior, so that when the windows are opened the hot air is forced out.

Figure 5:
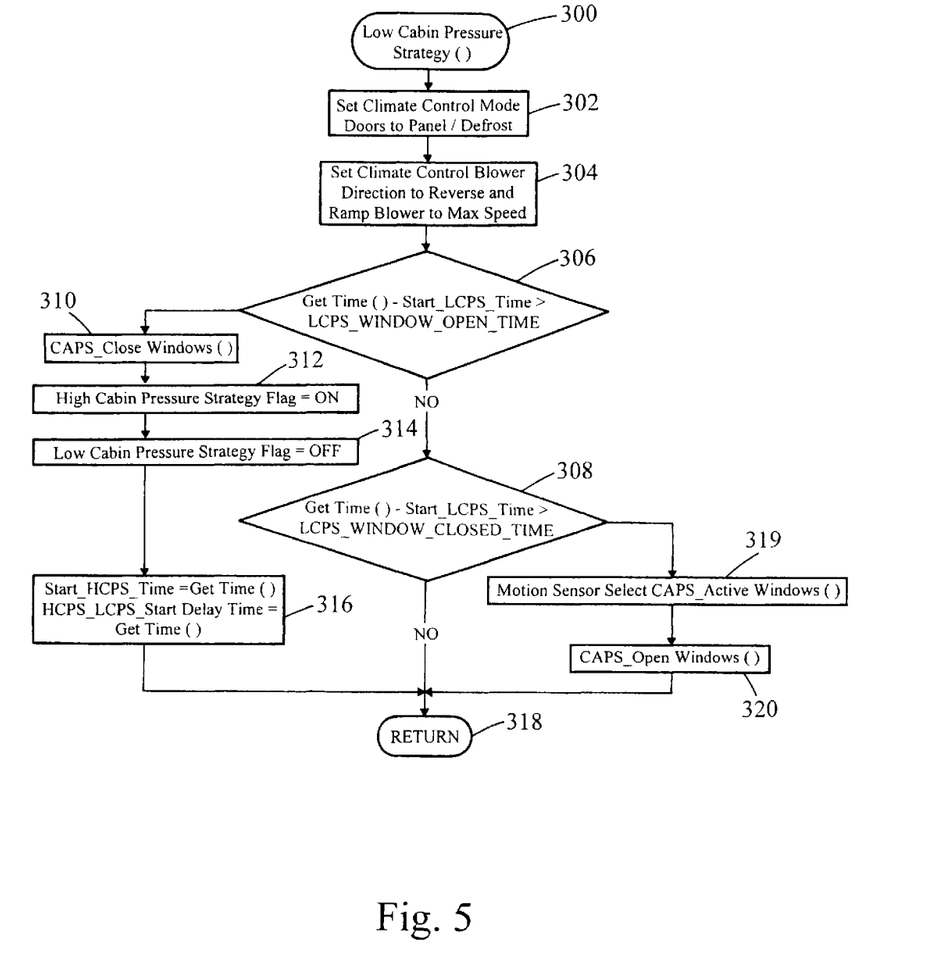
FIG. 5 is a flow diagram illustrating a method for carrying out a Low Cabin Pressure Strategy, in accordance with the present invention.

A low cabin pressure strategy is illustrated in flow chart form in FIG. 5. In operation, the low cabin pressure strategy is initiated, at block 300. At block 302, the climate control mode doors are set to panel/defrost. The climate control blower direction is set to reverse and the blower is set to maximum speed, as represented by 304. At block 306, the start_LCPS_Time is subtracted from the gettime( ) and the result is compared to an LCPS_Window_Open_Time variable. Here the system determines whether the windows have been open long enough. LCPS_Window_Open_Time must be greater than LCPS_Window_Closed_Time for the strategy to function properly. If the result is not greater than LCPS_Window_Open_Time variable the result is compared to LCPS_Window_Closed_Time variable to determine if the windows have been closed long enough, as represented by block 308. However, if the result is greater than LCPS_Window_Open_Time variable then a CAPS_CloseWindow routine is activated, at block 310. At block 312, the high cabin pressure strategy flag is set to "on". At block 314, the low cabin pressure strategy flag is set to "off". At block 316, a start_HCPS_Time variable is set equal to the getTime( ) variable and then terminates at return block 318. Thus, the LCPS is completed, the windows are closed and setup for HCPS.

If at block 308, the result of start_LCPS_Time subtracted from gettime( ) is greater than LCPS_Window_Closed_Time variable then a MotionSensorSelectCAPS_Active-Windows( ) and a CAPS_OpenWindow( ) routines are activated, at blocks 319 and 320. The MotionSensorSelectCAPS_ActiveWindows( ) routine determines wind direction and which windows should be opened. Thereafter, the strategy returns to the starting point, as represented by block 318. However, if at block 308, the result of start_LCPS_Time subtracted from gettime( ) is less than LCPS_Window_Closed_Time variable then the strategy terminates at return block 318.

Thus, in operation the low cabin pressure strategy expels hot air out of the vehicle via the panel and defrost vents, by running the blower in the reverse direction while the vehicle's windows are closed. The panel and defrost vents are used since the hotter air will rise within the vehicle interior. This creates a negative pressure within the interior of the vehicle, so that when the windows are opened fresh cool air rushes into the vehicle through the windows replacing the hot interior air.

Upon system reset or initialization key CAPS variables are initialized. For example, InCarHysteresisFlag is set to "on", VoltageHysteresisFlag is set to "on", HumidityHysteresisFlag is set to "on", SunloadHysteresisFlag is set to "on", and the DaylightHysteresisFlag is set to "on". Additionally, the CAPS_enabledFlag is set to "false", the LowCabinPressureStrategyFlag is set equal to the Low_CPS_Flag, the HighCabinPressureStrategyFlag is set equal to the High_CPS_Flag and the CabinPressureEqualizationStrategyCompleteFlag is set equal to "False". These calibration constants are stored in non-volatile RAM, such as EEPROM, and if both are set to off, the CAPS strategy will be disabled. This allows the manufacturing plant flexibility in deciding which vehicles have the CAPS strategy activated.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

What is claimed is:

1. A ventilation system for purging air contained within a vehicle interior, the system comprising:
    a blower located within the vehicle interior for creating a pressure differential between the vehicle interior and an exterior of the vehicle;
    a first vent in communication with the vehicle interior and exterior for expelling air from the vehicle interior;
    a second vent in communication with the vehicle interior and exterior for drawing external air into the vehicle interior;
    at least one interior sensor located within the vehicle interior for sensing an interior condition of the vehicle;
    at least one exterior sensor located external to the vehicle interior for sensing an external condition of an environment external to the vehicle interior;
    an ignition sensor in communication with a vehicle ignition switch for outputting a vehicle, ignition switch signal indicative of a state of the vehicle ignition switch; and
    a control module for controlling the blower, first and second vents, and for monitoring the interior and exterior sensors and comparing the sensor outputs to a plurality of predefined thresholds for actuating the blower, first and second vents to exhaust the air contained within the interior of the vehicle after the control module has determined that the vehicle ignition switch has been turned to an off state for a predefined period of time.

2. The system of claim 1 wherein the at least one interior sensor further comprises a temperature sensor.

3. The system of claim 1 wherein the at least one interior sensor further comprises a humidity sensor.

4. The system of claim 1 wherein the at least one interior sensor further comprises a sunload sensor.

5. The system of claim 1 wherein the at least one exterior sensor further comprises a temperature sensor.

6. The system of claim 1 wherein the at least one exterior sensor further comprises a humidity sensor.

7. The system of claim 1 wherein the at least one interior sensor further comprises a daylight sensor.

8. The system of claim 1 wherein the first vent is a vehicle interior defrost vent.

9. The system of claim 1 wherein the second vent is a vehicle window.

10. A method for ventilating air contained within a vehicle interior, the method comprising:
    determining an exterior condition external to the vehicle interior using at least one exterior sensor having exterior sensor output signals;
    determining an interior condition of the vehicle using at least one interior sensor located within the vehicle interior having interior sensor output signals;
    comparing the internal sensor output signals with the exterior sensor output signals;
    determining whether a difference between the internal sensor output signals and the exterior sensor output signals has exceeded a predefined threshold;
    creating a pressure differential between the interior and exterior of the vehicle using a blower;
    expelling air from the vehicle interior using a first vent;
    drawing external air into the vehicle using a second vent;
    determining whether a vehicle ignition switch is in an off position;
    determining how long the vehicle ignition switch has been in the off position; and
    monitoring the interior and exterior sensors to actuate the blower, first and second vents to exhaust the air contained within the interior of the vehicle and draw in ambient air after the vehicle ignition switch has been off for a predefined period of time.

11. The method of claim 10 further comprising determining whether the vehicle's windows are closed.

12. The method of claim 10 further comprising determining whether the second vent is closed.

13. The method of claim 10 further comprising adjusting the predefined period of time after the vehicle has been subjected to substantially the same exterior climate for a predefined amount of time.

* * * * *